(12) United States Patent
McBennett (10) Patent No.: US 6,433,300 B1
(45) Date of Patent: Aug. 13, 2002

(54) ELECTRODE INTERFACE BONDING

(75) Inventor: Michael C. McBennett, Lamar, SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 09/871,071

(22) Filed: May 31, 2001

(51) Int. Cl.$^7$ ............................................... B23K 10/00
(52) U.S. Cl. ............. 219/121.52; 219/119; 219/121.59; 219/75
(58) Field of Search ........................ 219/121.52, 121.48, 219/75, 74, 119, 121.59

(56) References Cited

U.S. PATENT DOCUMENTS

| | | | |
|---|---|---|---|
| 5,908,567 A | * 6/1999 | Sakuragi et al. | 219/212.52 |
| 6,020,572 A | 2/2000 | Marner et al. | |
| 6,114,650 A | * 9/2000 | Marner et al. | 219/121.52 |
| 6,177,647 B1 | * 1/2001 | Zapletal | 219/121.52 |
| 6,329,627 B1 | * 12/2001 | Walters | 219/121.52 |

FOREIGN PATENT DOCUMENTS

JP    4-147772    5/1992

OTHER PUBLICATIONS

William D. Callister, Jr., Materials Science and Engineering—An Introduction, Department of Materials Science and Engineering, The University of Utah, Chapter 9, pp. 246–272, Second Edition, John Wiley & Sons, Inc., USA.

Osamu Taguchi, Yoshiaki Iijima, Reaction diffusion in the silver–hafnium system, Journal of Alloys and Compounds 226 (1995) pp. 185–189, Elsevier Science S.A.

* cited by examiner

*Primary Examiner*—Mark Paschall
(74) *Attorney, Agent, or Firm*—Alston & Bird LLP (57) ABSTRACT

An electrode for a plasma arc torch and method of fabricating the same are disclosed, and wherein the electrode comprises a copper holder defining a cavity in a forward end. An emissive element and separator assembly is positioned in the cavity, and no brazing materials are used to secure the components of the electrode. An intermetallic compound is formed between the emissive element and the separator, and a eutectic alloy is formed between the separator and metallic holder by independent heating steps. A crimping process is also disclosed for further strengthening the electrode and increasing the operational life span thereof.

33 Claims, 8 Drawing Sheets

ELECTRODE INTERFACE BONDING

FIELD OF THE INVENTION

The present invention relates to plasma arc torches and, more particularly, to a method of forming an electrode for supporting an electric arc in a plasma arc torch.

BACKGROUND OF THE INVENTION

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex flow of gas, and in some torch designs it is conventional to also envelop the gas and arc with a swirling jet of water.

The electrode used in conventional torches of the described type typically comprises an elongate tubular member composed of a material of high thermal conductivity, such as copper or a copper alloy. The forward or discharge end of the tubular electrode includes a bottom end wall having an emissive element embedded therein which supports the arc. The element is composed of a material which has a relatively low work function, which is defined in the art as the potential step, measured in electron volts (ev), which permits thermionic emission from the surface of a metal at a given temperature. In view of its low work function, the element is thus capable of readily emitting electrons when an electrical potential is applied thereto. Commonly used emissive materials include hafnium, zirconium, tungsten, and their alloys. Some electrodes include a relatively non-emissive separator, which is disposed about the emissive element and acts to prevent the arc from migrating from the emissive element to the copper holder.

A problem associated with torches of the type described above is the short service life of the electrode, particularly when the torch is used with an oxidizing gas, such as oxygen or air. More particularly, the gas tends to rapidly oxidize the copper of the electrode that surrounds the emissive element, and as the copper oxidizes, its work function decreases. As a result, a point is reached at which the oxidized copper surrounding the emissive element begins to support the arc, rather than the element. When this happens, the copper oxide and the supporting copper melt, resulting in early destruction and failure of the electrode.

Many conventional electrodes are assembled by pressing the emissive insert into the metallic holder, or by pressing the emissive insert into a relatively less- or non- emissive sleeve or separator that is then pressed into the metallic holder. The interfaces between the press-fit emissive element, separator, and holder are relatively well defined, and thereby negatively affect the thermal conductivity of the assembled electrode. Specifically, heat travelling through the electrode encounters the interfaces, which act as barriers to heat transfer and thus restrict the heat transfer ability of the electrode. In addition, the well defined interfaces act as stress concentrators that may attract the arc and accelerate the demise of the electrode.

In order to help "smooth" the interfaces between the emissive element, separator, and holder, the assignee of the present invention has developed a diffusion bonding technique described in a co-pending application with Ser. No. 09/773,847 ("the '847 application") entitled "Electrode Diffusion Bonding." In the co-pending '847 application, a post-assembly heating step is described that creates a diffusion bond between the separator and the metallic holder. The diffusion bond softens or smoothes the interface between the two materials, while increasing the bond strength therebetween. As a result, the electrode has a longer operational life.

While the post-assembly heating step of the co-pending '847 application represents an improvement in the state of the art, further improvements are desired. In particular, a study of the materials used in an electrode shows that most electrodes employ an emissive element comprising hafnium, zirconium, or the like; a separator comprising silver, gold, nickel, or the like; and a metallic holder comprising copper. While the post-assembly heating step of the co-pending '847 application improves the bond between the separator and the holder, it is desirable to further improve the bond therebetween.

Furthermore, it is also desirable to improve the bond between the emissive element and separator. And while the post-assembly heating step of the co-pending '847 application is particularly advantageous for improving the bond between materials such as silver and copper, the relatively high temperature resistance of the emissive element and the separator may cause the bond between the separator and the holder to be destroyed if any heat treatment of the emissive element was attempted. Thus, a problem exists in attempts to form a strong bond between both the emissive element and separator, and between the separator and the metallic holder.

SUMMARY OF THE INVENTION

The present invention was developed to improve upon conventional methods of making electrodes. It has been discovered that the difficulties of conventional electrodes, namely increasing the life and performance of electrodes for plasma torches, can be overcome by forming an electrode in a two-stage assembly and heating process, wherein strong bonds are formed between the emissive element and separator, and between the separator and metallic holder. Advantageously, the heating step of each stage is adapted according to the particular materials used in the emissive element, separator, and holder so that the bond strength between the elements of the electrode are maximized.

In particular, a method of fabricating an electrode according to the present invention includes forming an assembly by inserting an emissive element having a relatively low work function in a relatively non-emissive separator. The separator, which is formed of a metallic material having a work function greater than that of the emissive element, has inner and outer surfaces wherein the inner surface of the separator and the outer surface of the emissive element are in surface-to-surface contact. The assembly is then heated such that an intermetallic compound is formed between the separator and the emissive element. In one embodiment, the intermetallic compound is formed after heating the separator and the emissive element to between about 1700° F.–1800° F.

According to one embodiment, the assembly is positioned in a cavity defined by a metallic holder after the intermetallic compound has been formed between the separator and the emissive element. In particular, the outer surface of the separator is in surface-to-surface contact with the cavity defined by the metallic holder. After the assembly is in place, a eutectic alloy is formed between the separator and the metallic holder. In one embodiment, the eutectic alloy is formed by heating a copper metallic holder and a silver separator to between about 1400° F.–1450° F., and more particularly to about 1430° F.–1435° F., as this is a preferred eutectic forming temperature for these materials. The eutectic alloy forming step is a relatively rapid procedure, wherein the separator and the metallic holder are heated to the eutectic forming temperature for about 0.02–20 minutes. The assembled electrode can also be crimped to provide improve the strength of the electrode.

The intermetallic compound and the eutectic alloy according to the present invention each provide a superior bond between the emissive element and separator, and the separator and metallic holder, respectively. In particular, the intermetallic compound and the eutectic alloy preferably have thicknesses that are greater than that of a diffusion bond, so that the electrode is more strongly bonded together and thus has a longer operational life.

Thus, the present invention provides electrodes and methods of making electrodes having stronger bonds between the elements thereof, which improves the strength and operational life span of the electrode. Furthermore, the methods of making an electrode according to the present invention are directed to electrodes that do not require brazing materials, coatings, or other layers present between the emissive element, separator, or metallic holder. In this regard, the cost and complexity of fabricating the electrode is reduced.

BRIEF DESCRIPTION OF THE DRAWINGS

Having thus described the invention in general terms, reference will now be made to the accompanying drawings, which are not necessarily drawn to scale, wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
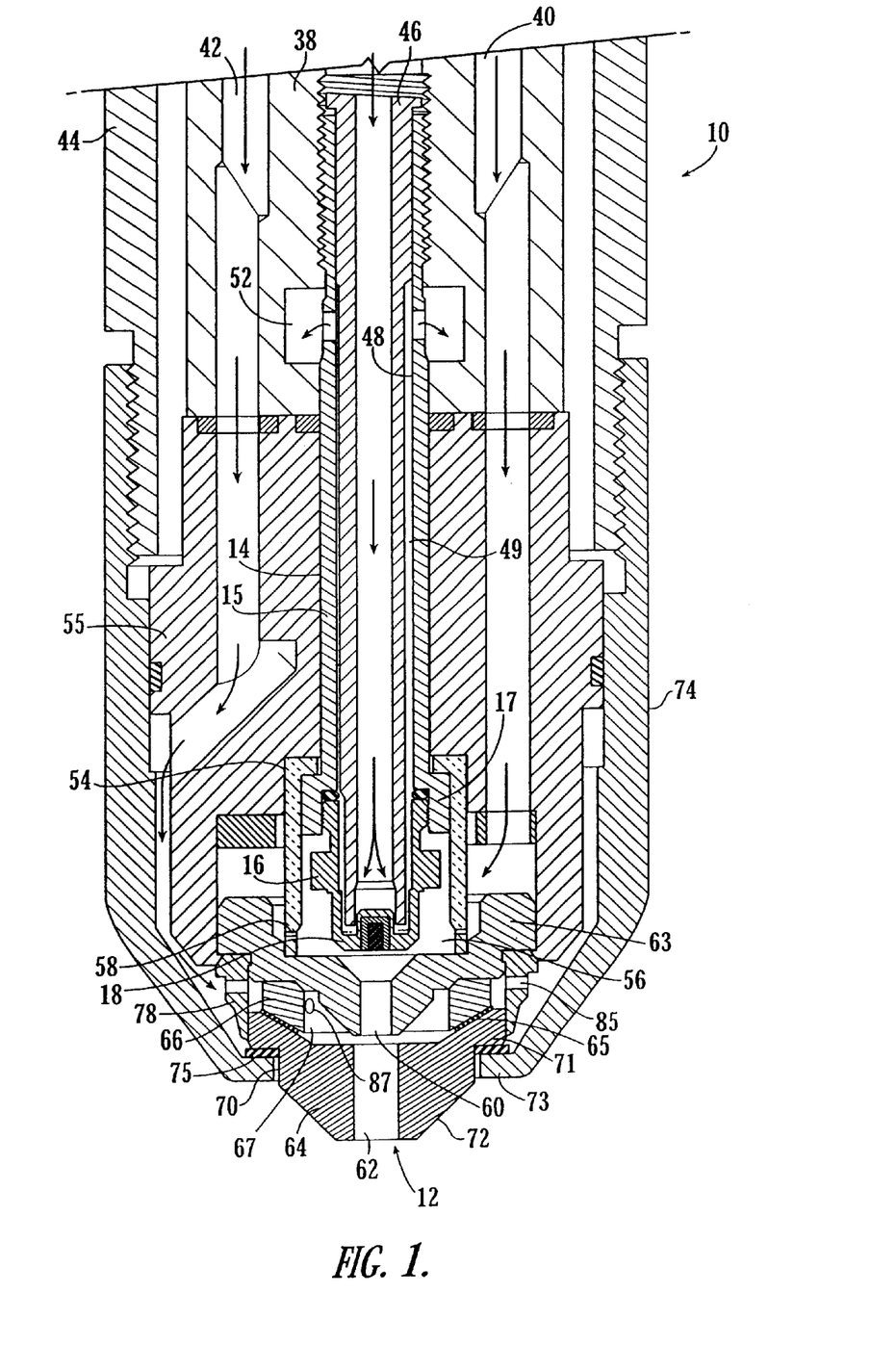
FIG. 1 is a sectioned side elevational view of a plasma arc torch which embodies the features of the present invention.
Figure 2:
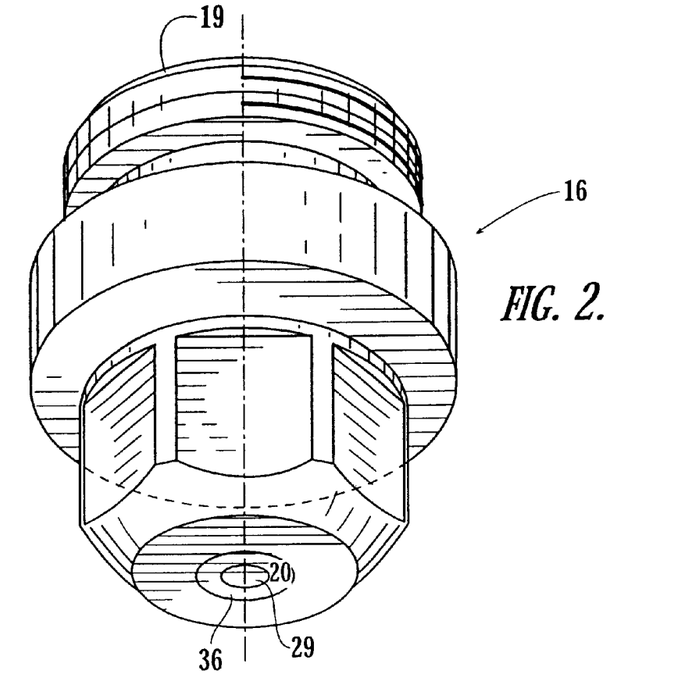
FIG. 2 is an enlarged perspective view of an electrode in accordance with the present invention.
Figure 3:
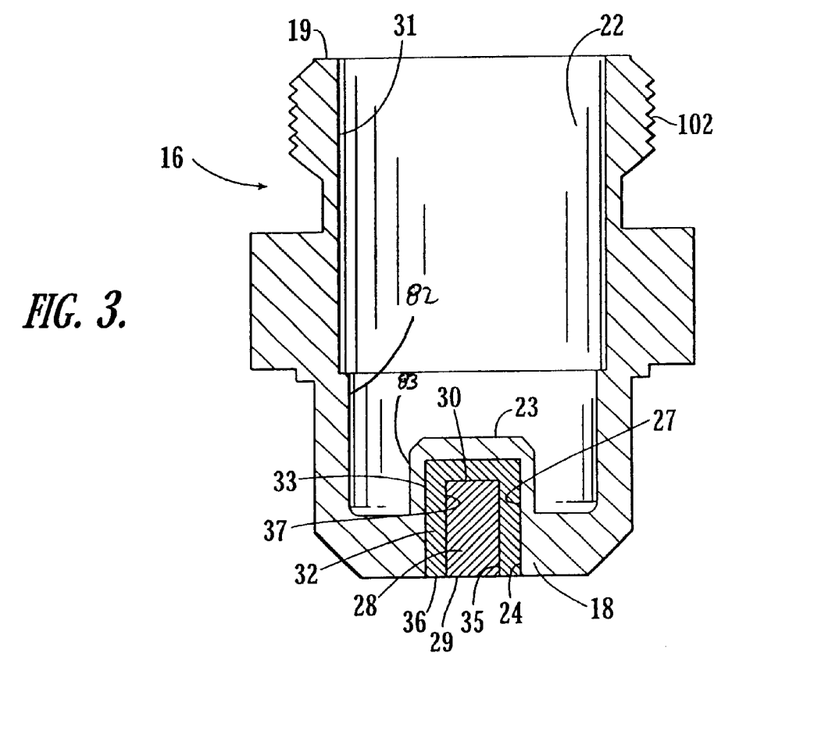
FIG. 3 is an enlarged sectional side view of an electrode in accordance with the present invention.

With reference to FIGS. 1–3, a plasma arc torch 10 embodying the features of the present invention is depicted. The torch 10 includes a nozzle assembly 12 and a tubular electrode 14. The electrode 14 preferably is made of copper or a copper alloy, and is composed of an upper tubular member 15 and a lower cup-shaped member or holder 16. The upper tubular member 15 is of elongate open tubular construction and defines the longitudinal axis of the torch 10. The upper tubular member 15 includes an internally threaded lower end portion 17. The holder 16 is also of tubular construction, and includes a lower front end and an upper rear end. A transverse end wall 18 closes the front end of the holder 16, and the transverse end wall 18 defines an outer front face 20. The rear end of the holder 16 is externally threaded and is threadedly joined to the lower end portion 17 of the upper tubular member 15.

The holder 16 is open at the rear end 19 thereof such that the holder is of cup-shaped configuration and defines an internal cavity 22. The internal cavity 22 has a surface 31 that includes a cylindrical post 23 extending into the internal cavity along the longitudinal axis. A generally cylindrical cavity 24 is formed in the front face 20 of the end wall 18 and extends rearwardly along the longitudinal axis and into a portion of the holder 16. The cavity 24 includes inner side surface 27.

A relatively non-emissive separator 32 is positioned in the cavity 24 and is disposed coaxially along the longitudinal axis. The separator 32 has an outer peripheral wall 33 extending substantially the length of the cavity 24. The peripheral wall 33 is illustrated as having a substantially constant outer diameter over the length of the separator, although it will be appreciated that other geometric configurations would be consistent with the scope of the invention, such as frustoconical. The separator 32 also defines an internal cavity 35 having a surface 37. The separator 32 also includes an outer end face 36 which is generally flush with the front face 20 of the holder 16.

An emissive element or insert 28 is positioned in the separator 32 and is disposed coaxially along the longitudinal axis. More specifically, the emissive element 28 and the separator 32 form an assembly wherein the emissive element is secured to the separator by an interference or press fit. An intermetallic compound, which is effected by heating the emissive element and the separator, is interposed therebetween as discussed more fully below. The emissive element 28 has a circular outer end face 29 lying in the plane of the front face 20 of the holder 16 and the outer end face 36 of the separator 32. The emissive element 28 also includes a generally circular inner end face 30 which is disposed in the cavity 35 defined by the separator 32 and is opposite the outer end face 29. The inner end face 30, however, can have other shapes, such as pointed, polygonal, or spherical, in order to assist in securing the emissive element to the separator 32. In addition, the diameter of the emissive element 28 is about 30–80 percent of the outer diameter of the end face 36 of the separator 32, which has a radial thickness of at least about 0.25 mm (0.01 inch) at the outer end face 36 and along its entire length. As a specific example, the emissive element 28 typically has a diameter of about 0.08 inch and a length of about 0.25 inch, and the outer diameter of the separator 32 is about 0.25 inch.

The emissive element 28 is composed of a metallic material having a relatively low work function, such as in a range of about 2.7 to 4.2 ev, so as to be capable of readily emitting electrons upon an electrical potential being applied thereto. Suitable examples of such materials are hafnium, zirconium, tungsten, and mixtures thereof.

The separator 32 is composed of a metallic material having a work function that is greater than that of the material of the holder 16, according to values presented in Smithells Metal Reference Book, 6th Ed. More specifically, it is preferred that the separator 32 be composed of a metallic material having a work function of at least about 4.3 ev. In a preferred embodiment, the separator 32 comprises silver, although other metallic materials, such as gold, platinum, rhodium, iridium, palladium, nickel, and alloys thereof, may also be used. The selected material for the separator 32 should have high thermal conductivity, high resistance to oxidation, high melting point, high work function, and low cost. Although it is difficult to maximize all of these properties in one material, silver is preferred due to its high thermal conductivity.

For example, in one particular embodiment of the present invention, the separator 32 is composed of a silver alloy material comprising silver alloyed with about 0.25 to 10 percent of an additional material selected from the group consisting of copper, aluminum, iron, lead, zinc, and alloys thereof. The additional material may be in elemental or oxide form, and thus the term "copper" as used herein is intended to refer to both the elemental form as well as the oxide form, and similarly for the terms "aluminum" and the like.

With reference again to FIG. 1, the electrode 14 is mounted in a plasma torch body 38, which includes gas and liquid passageways 40 and 42, respectively. The torch body 38 is surrounded by an outer insulated housing member 44. A tube 46 is suspended within the central bore 48 of the electrode 14 for circulating a liquid cooling medium, such as water, through the electrode 14. The tube 46 has an outer diameter smaller than the diameter of the bore 48 such that a space 49 exists between the tube 46 and the bore 48 to allow water to flow therein upon being discharged from the open lower end of the tube 46. The water flows from a source (not shown) through the tube 46, inside the internal cavity 22 and the holder 16, and back through the space 49 to an opening 52 in the torch body 38 and to a drain hose (not shown). The passageway 42 directs injection water into the nozzle assembly 12 where it is converted into a swirling vortex for surrounding the plasma arc, as further explained below. The gas passageway 40 directs gas from a suitable source (not shown), through a gas baffle 54 of suitable high temperature material into a gas plenum chamber 56 via inlet holes 58. The inlet holes 58 are arranged so as to cause the gas to enter in the plenum chamber 56 in a swirling fashion. The gas flows out of the plenum chamber 56 through coaxial bores 60 and 62 of the nozzle assembly 12. The electrode 14 retains the gas baffle 54. A high-temperature plastic insulator body 55 electrically insulates the nozzle assembly 12 from the electrode 14.

The nozzle assembly 12 comprises an upper nozzle member 63 which defines the first bore 60, and a lower nozzle member 64 which defines the second bore 62. The upper nozzle member 63 is preferably a metallic material, and the lower nozzle member 64 is preferably a metallic or ceramic material. The bore 60 of the upper nozzle member 63 is in axial alignment with the longitudinal axis of the torch electrode 14. The lower nozzle member 64 is separated from the upper nozzle member 63 by a plastic spacer element 65 and a water swirl ring 66. The space provided between the upper nozzle member 63 and the lower nozzle member 64 forms a water chamber 67.

The lower nozzle member 64 comprises a cylindrical body portion 70 that defines a forward or lower end portion and a rearward or upper end portion, with the bore 62 extending coaxially through the body portion 70. An annular mounting flange 71 is positioned on the rearward end portion, and a frustoconical surface 72 is formed on the exterior of the forward end portion coaxial with the second bore 62. The annular flange 71 is supported from below by an inwardly directed flange 73 at the lower end of the cup 74, with the cup 74 being detachably mounted by interconnecting threads to the outer housing member 44. A gasket 75 is disposed between the two flanges 71 and 73.

The bore 62 in the lower nozzle member 64 is cylindrical, and is maintained in axial alignment with the bore 60 in the upper nozzle member 63 by a centering sleeve 78 of any suitable plastic material. Water flows from the passageway 42 through openings 85 in the sleeve 78 to the injection ports 87 of the swirl ring 66, which injects the water into the water chamber 67. The injection ports 87 are tangentially disposed around the swirl ring 66, to impart a swirl component of velocity to the water flow in the water chamber 67. The water exits the water chamber 67 through the bore 62.

A power supply (not shown) is connected to the torch electrode 14 in a series circuit relationship with a metal workpiece, which is usually grounded. In operation, a plasma arc is established between the emissive element 28 of the electrode, which acts as the cathode terminal for the arc, and the workpiece, which is connected to the anode of the power supply and is positioned below the lower nozzle member 64. The plasma arc is started in a conventional manner by momentarily establishing a pilot arc between the electrode 14 and the nozzle assembly 12, and the arc is then transferred to the workpiece through the bores 60 and 62.

METHOD OF FABRICATION

Figures 4, 5:
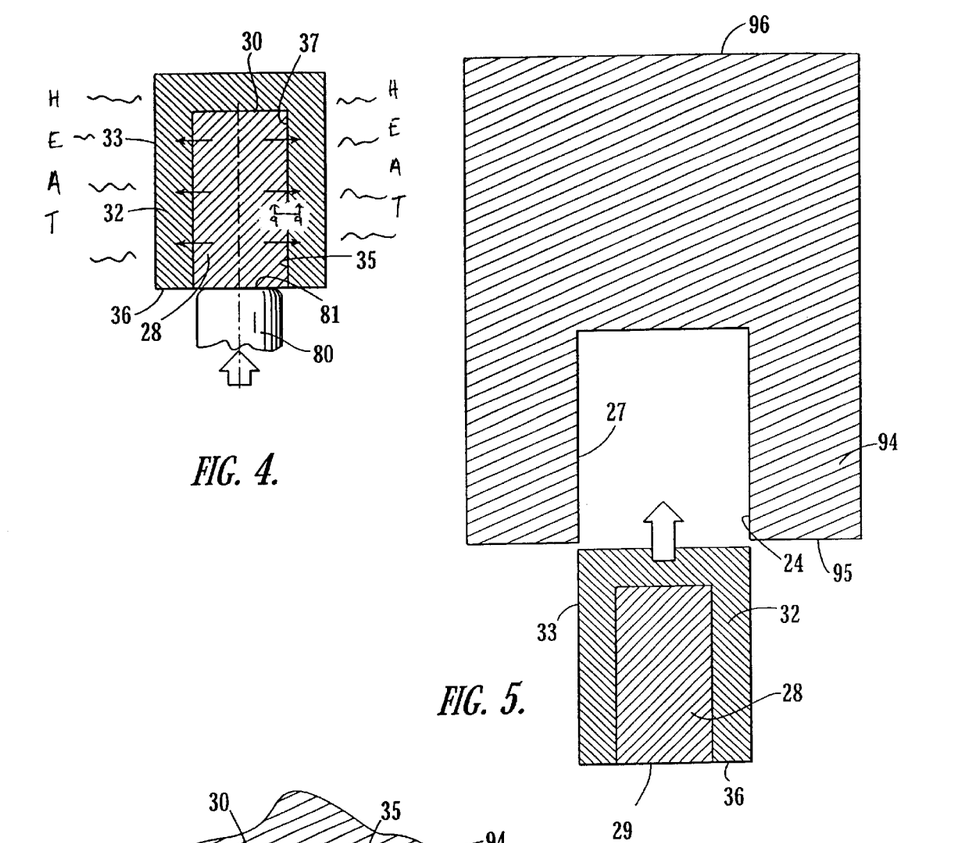
FIGS. 4–8 are schematic views illustrating the steps of a preferred method of fabricating the electrode in accordance with the invention.

The invention also provides a simplified method for fabricating an electrode of the type described above. FIGS. 4–8 illustrate a preferred method of fabricating the electrode in accordance with the present invention. As shown in FIG. 4, the emissive insert 28 is disposed in the cavity 35 defined by the separator 32. According to one embodiment, the emissive element 28 is disposed in the cavity 35 of the separator 32 by using a tool 80 having a generally planar circular working surface 81. The tool 80 is placed with the working surface 81 in contact with the emissive element 28 in the cavity 35. The outer diameter of the working surface 81 is slightly smaller than the diameter of the cavity 35 defined by the separator 32. The tool 80 is held with the working surface 81 generally coaxial with the longitudinal axis of the torch 10, and force is applied to the tool so as to impart axial compressive forces to the emissive element 28 and the separator 32 along the longitudinal axis. For example, the tool 80 may be positioned in contact with the emissive element 28 and separator 32 and then struck by a suitable device, such as the ram of a machine.

Regardless of the specific technique used, sufficient force should be imparted so as to position the emissive element 28 in the cavity 35 of the separator 32 such that the inner end face 30 of the emissive element is in surface-to-surface contact with the separator. In one embodiment, the compressing action of the emissive element 28 also results in the emissive element and the separator 32 being slightly deformed radially outwardly such that the emissive element 28 is tightly gripped and retained by the separator in a surface-to-surface relationship. The separator 32 can also be crimped about the emissive element 28.

Figure 9:
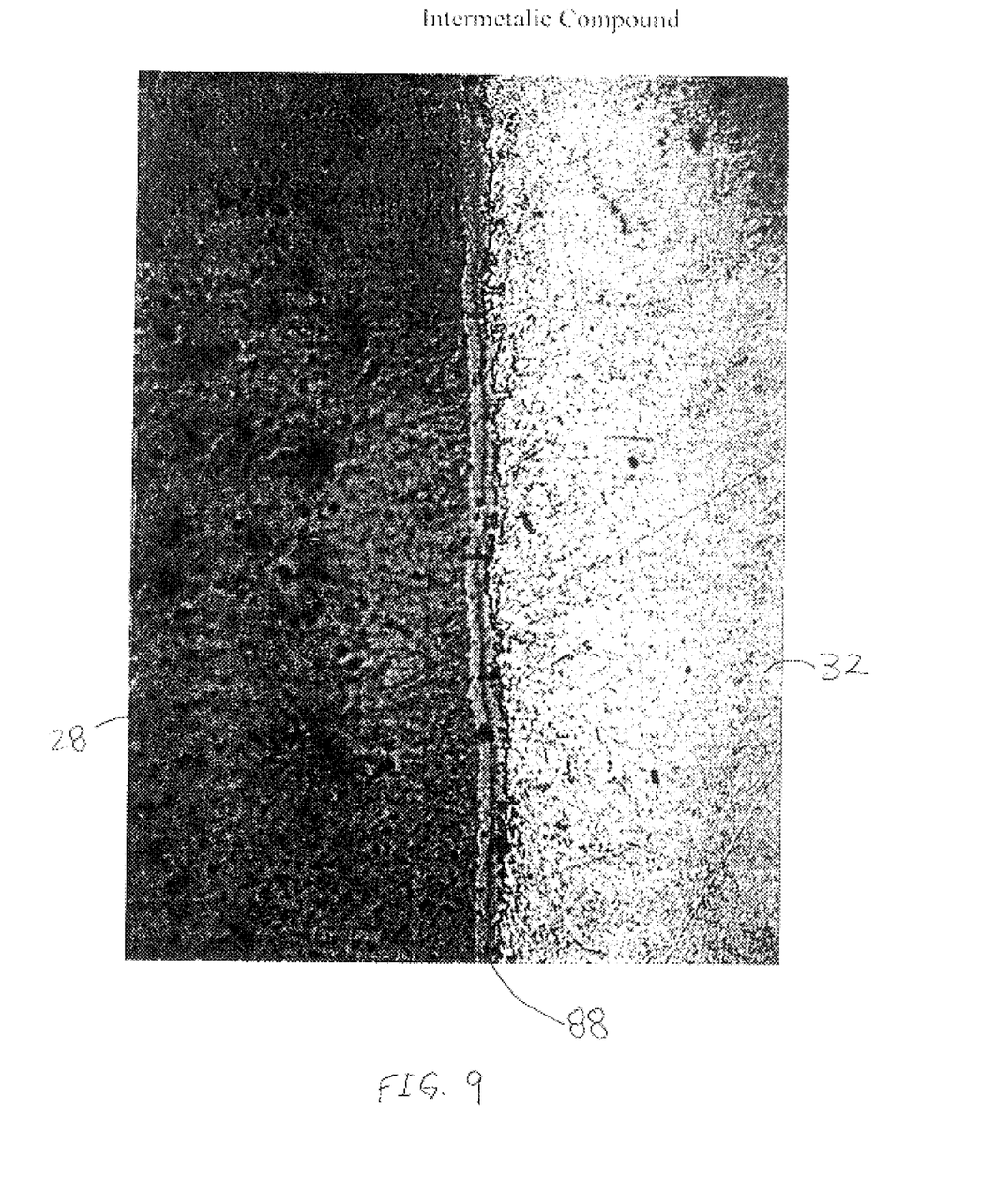
FIG. 9 is a greatly enlarged sectional photograph of the electrode of the present invention as seen along lines 9—9 of FIG. 4 shortly after a heating operation.

In one embodiment, the emissive element 28 and the separator 32 are heated to between about 1700° F.–1800° F. for about one hour, although the heating time may vary depending on the sizes and materials used. At this temperature range and time combination, an intermetallic compound 88 is formed between the emissive element 28 and separator 32. The intermetallic compound 88 between an emissive element 28 made of hafnium and a separator 32 made of silver is shown in FIG. 9. The intermetallic compound 88 provides a stronger bond between the emissive element 28 and the separator 32 compared to diffusion bonding, as the thickness of the intermetallic compound is about 0.0004". The intermetallic compound 88 is a new material having unique properties different from both the materials forming the emissive element 28 and the separator 32.

As described, the intermetallic compound 88 is formed at a relatively high temperature of between about 1700° F.–1800° F., as discussed more fully below. The relatively high temperature is required due to the materials used in the emissive element 28 and the separator 32, and the intermetallic compound 88 is preferably formed before the assembly is inserted in the metallic holder 16, as discussed more fully below.

Turning to FIG. 5, a cylindrical blank 94 of copper or copper alloy is provided having a front face 95 and an opposite rear face 96. A generally cylindrical bore is then formed, such as by drilling, in the front face 95 along the longitudinal axis so as to form the cavity 24 as described above. The emissive element 28 and separator 32 assembly, which in one embodiment includes the formed intermetallic compound 88, is then inserted into the cavity 24, such as by press-fitting, such that the peripheral wall 33 of the separator slidably engages the inner wall 27 of the cavity and is secured thereto in a surface-to-surface, frictional relationship.

Figure 6:
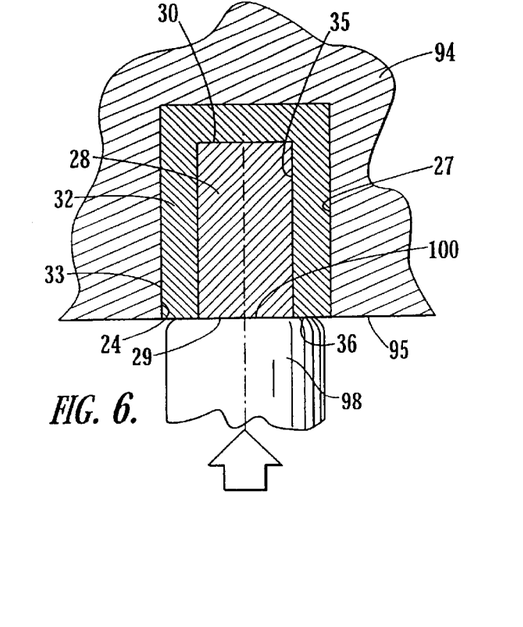

According to one embodiment shown in FIG. 6, a tool 98 having a generally planar circular working surface 100 is placed with the working surface in contact with the end faces 29 and 36 of the emissive element 28 and separator 32, respectively. The outer diameter of the working surface 100 is slightly smaller than the diameter of the cavity 24 in the cylindrical blank 94. The tool 98 is held with the working surface 100 generally coaxial with the longitudinal axis of the torch 10, and force is applied to the tool so as to impart axial compressive forces to the emissive element 28 and the separator 32 along the longitudinal axis. For example, the tool 98 may be positioned in contact with the emissive element 28 and separator 32 and then struck by a suitable device, such as the ram of a machine. Regardless of the specific technique used, sufficient force is imparted so as to cause the emissive element 28 and the separator 32 to be deformed radially outwardly such that the emissive element is tightly gripped and retained by the separator, and the separator is tightly gripped and retained by the cavity 24. Care must be taken, however, so as not to destroy or damage the intermetallic compound 88 (if present) between the emissive element 28 and the separator 32.

Figure 7:
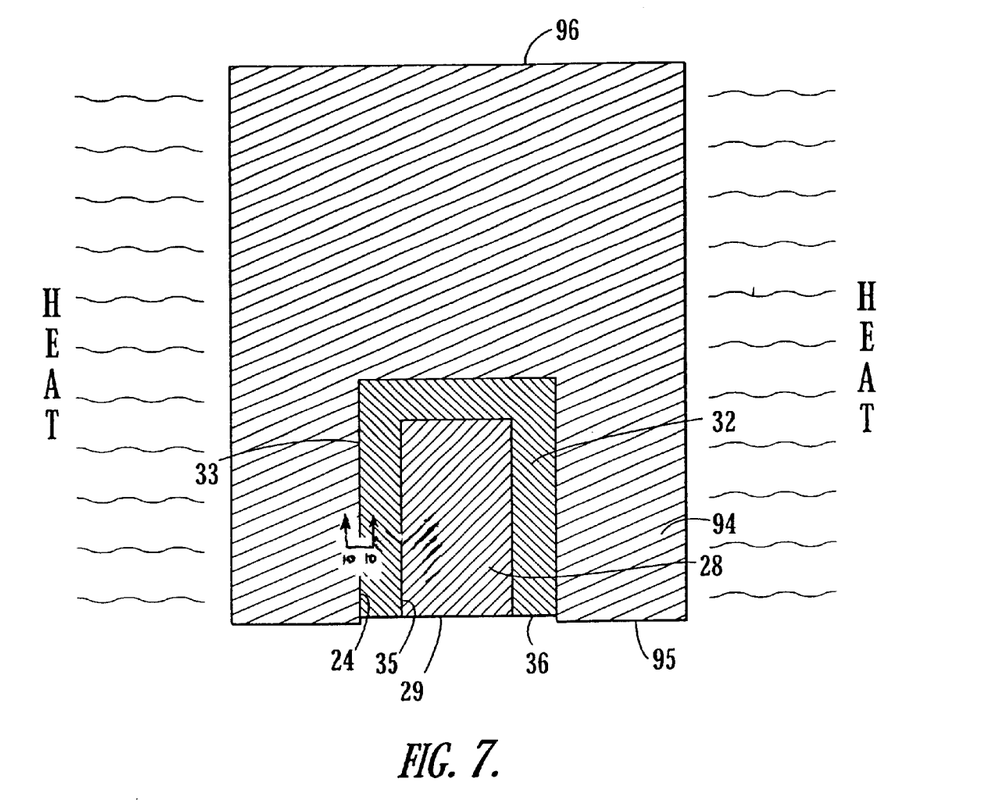

FIG. 7 also shows the addition of heat to the cylindrical blank 94, separator 32, and emissive element 28, which results in improved properties and life span of the electrode. The heating process occurs after the emissive element 28 and separator 32 assembly has been positioned in the metallic holder or blank 94. The heating process could also be performed after further machining steps are performed on the cylindrical blank, as described below. The exact heating process is dependent on the materials used in the emissive element 28 and the material used in the separator 32. In particular, the heating process is determined by the melting temperature of the materials, and is performed to form a eutectic alloy between the separator 32 and the metallic holder or blank 94. An induction-heating unit (not shown) can be used to perform all the heating processes described herein, although a furnace is preferable because of its superior temperature control.

The heating process to form the eutectic alloy is akin to a heat "spike," as the heating temperature is greater than the heating temperature used when a diffusion bond is desired. In one embodiment where the separator comprises silver and the metallic blank comprises copper, the eutectic temperature is about 1432° F., whereas the diffusion bonding temperature is about 1410° F. At the eutectic temperature, the copper and silver fuse together to form the eutectic alloy, which strongly bonds the emissive element 28 and the separator 32 together.

The assembled electrode should be held at this temperature for only a relatively short period of time, such as between about 10–20 minutes. If the assembled electrode is heated for longer than about 20 minutes, the eutectic alloy may melt away, which leaves voids between the metallic holder and the separator. In addition, the temperature sustained during the eutectic alloy forming step is preferably closely controlled to within about 2 degrees. Otherwise, not achieving the eutectic temperature will fail to form the eutectic alloy, and exceeding the eutectic temperature will melt the eutectic alloy and disadvantageously leave the voids as described above.

The forming of the eutectic alloy by "spiking" the heat as described above is preferably performed in addition to forming the intermetallic compound 88. The eutectic alloy formation temperature is substantially lower than the intermetallic compound formation temperature, and one advantageous feature of the present invention is that the intermetallic compound 88 is formed before forming the eutectic alloy (if both are desired in the same electrode). The eutectic alloy can also be formed in conjunction with a diffusion bonding process wherein the holder 16 and the separator 32 are heated to below the eutectic temperature to increase the rate of diffusion bonding, and then "spiked" as described above to form the eutectic alloy. A cooling step could also be performed between the diffusion bonding process and the eutectic alloy forming process, although it is also possible to spike the heating temperature directly from the diffusion bonding temperature.

Diffusion bonding occurs when two pieces of metal are pressed and held together. Atoms of one metal will migrate to the other metal and vice-versa. At room temperature, significant diffusion bonding may take several years to develop, but it will occur. However, heating the assembled components of the electrode increases the rate of diffusion bonding. In this regard, it is beneficial to heat the electrode to a point where the diffusion bonding process is accelerated. However, the "spike" described above further improves the bond between adjacent surfaces.

For example, in one embodiment wherein the separator 32 comprises silver and the holder 16 comprises copper, a diffusion bonding process is performed by heating the separator and holder to about 1410° F. for about 8 hours. The separator 32 and holder 16 (or blank 94 as the case may be) are then briefly heated up to the eutectic temperature, which in this example is about 1432° F., for about 10–20 minutes. After the eutectic alloy is formed, the electrode is cooled. The resulting eutectic alloy advantageously performs like a brazing material, except that the eutectic alloy is formed by the existing components of the electrode, and not formed from an added material like conventional brazing materials. A similar bonding process could also be used between the emissive element 28 and the separator 32 in conjunction with the formation of the eutectic alloy.

Figure 10:
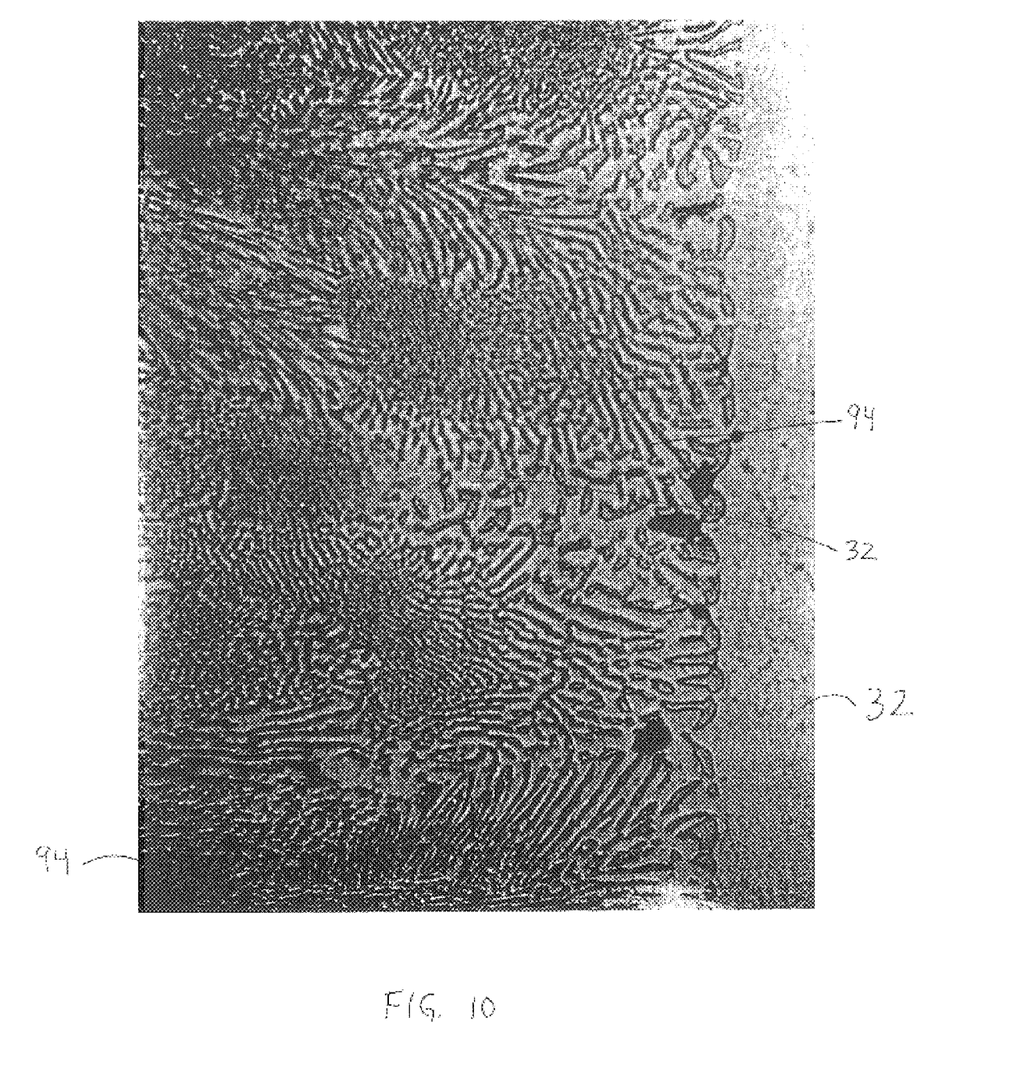
FIG. 10 is an enlarged sectional side photograph of the electrode of the present invention as seen along lines 10—10 of FIG. 7 shortly after a heating operation.

FIG. 10 shows a detailed cross-sectional view of the separator 32 and the metallic blank 94 after the heating process shown in FIG. 7. Specifically, FIG. 10 shows a greatly enlarged view of the interface between the separator 32 and the metallic blank 94 along lines 10—10 in FIG. 7. In a presently preferred embodiment, the separator 32 is formed primarily of silver, and the metallic blank 94 is formed primarily of copper. As shown in FIG. 10, the heating process causes the separator 32 and the metallic blank 94 to combine into the eutectic alloy, which has a cross-sectional appearance of a series of ridges and valleys having a "fingerprint" like appearance. As shown in FIG. 10, the darker areas are the metallic blank 94, while the lighter portions are the separator 32. By definition, the eutectic alloy has a lower melting temperature than the materials forming the metallic blank 94 or the separator 32.

Figure 8:
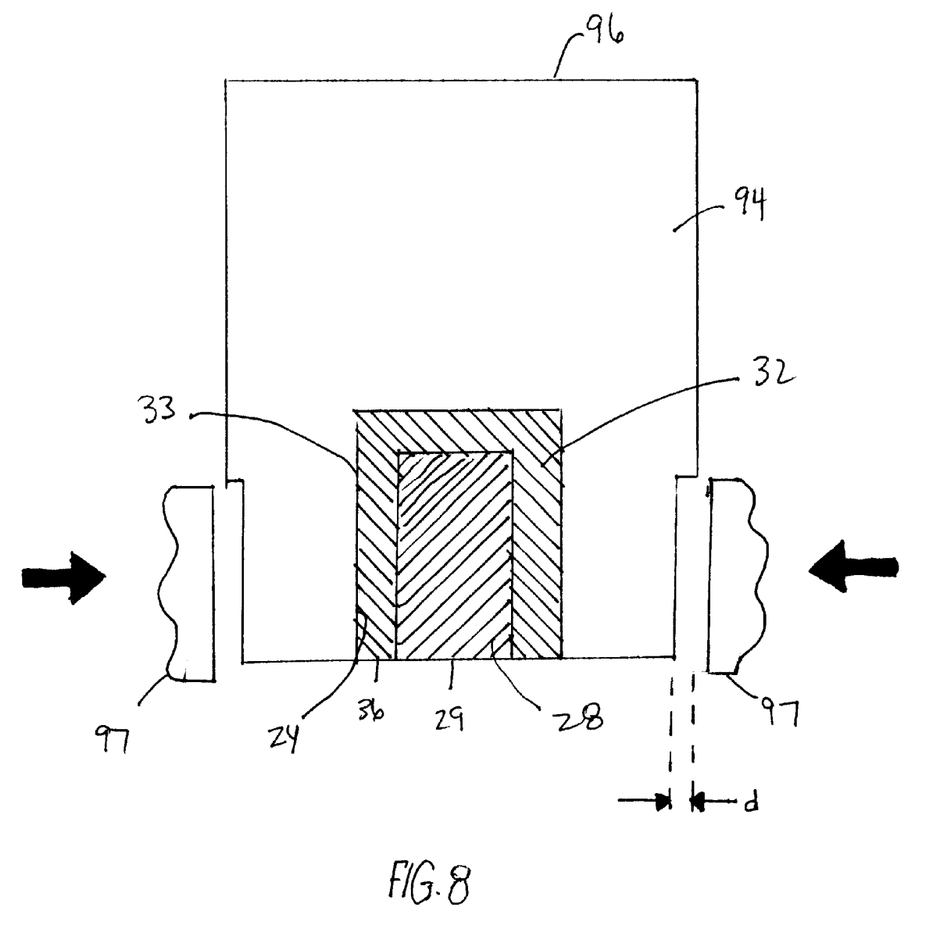

FIG. 8 shows another process that also enhances the strength of the electrode and thus the operational life span of the electrode. In particular, FIG. 8 illustrates a crimping process at the front end of the electrode using pressing tools 97. The pressing tools 97 act radially inwardly against the outer surface of the metallic blank 94 to press the blank, separator 32, and emissive element 28 together, which further bonds the materials together. In one embodiment, the diameter of the metallic blank 94 is reduced an amount d, which in one embodiment is between about 0.050–0.100 inches. The outer shape can also be changed during crimping, such as from a cylindrical blank to a hexagonal shape as illustrated. The crimping process could also be performed after the blank 94 has been machined into a near-final form.

The crimping process provides at least two benefits. One benefit is that the pressing action causes any voids present between the emissive element 28, separator 32, and metallic blank 94 to be substantially eliminated. This is important because voids act as stress concentrators, which may lead to early failure of the electrode. In particular, the damaging voids can be created if the heating process during the eutectic alloy forming step is too great. If this occurs, the eutectic alloy formed between the separator 32 and the metallic blank 94 melts away, leaving a thin void. If crimping were not used (and thus the void not closed), the electrode life would be poor, such as between about 0–20 minutes. If crimping is performed, however, the electrode life is orders of magnitude higher, such as between 300–400 minutes or more. Thus, crimping can be used as a safeguard against excessive heating during the eutectic alloy forming step. Another benefit is that the pressing action restores the yield strength and hardness of the emissive element 28, separator 32, and metallic blank 94 that may have been lost during the heating process discussed above. However, care must be taken during the pressing action, as over-crimping the electrode may destroy the bonds formed between the components thereof.

The following tables present conventional and experimental data showing the effects of heating and crimping the electrode as discussed above. Specifically, the crimping process includes reducing the electrode from a cylindrical shape having a diameter of about 0.625" to a hexagonal shape having an outer diameter of about 0.497". Note that Table I shows electrode operational life span at 260 Amps. The average experimental electrodes in Table I had a life span of approximately 819 minutes, whereas conventional electrodes not receiving the heating and crimping processes according to the present invention have an average life span of 664 minutes. The plasma arc torch used for obtaining the test results shown in Table I was ESAB Torch PT-15XL using oxygen as the plasma gas.

TABLE I

| ELECTRODE | LIFE SPAN @ 260 AMPS |
| --- | --- |
| CONVENTIONAL | 475 |
| EXPERIMENTAL | 862 |
| EXPERIMENTAL | 932 |
| EXPERIMENTAL | 805 |
| EXPERIMENTAL | 722 |
| EXPERIMENTAL | 628 |
| EXPERIMENTAL | 660 |
| EXPERIMENTAL | 845 |
| EXPERIMENTAL | 901 |
| EXPERIMENTAL | 710 |

Referring back to FIG. 3, a cross-sectional view of a completed electrode according to the present invention is shown. To complete the fabrication of the holder 16, the rear face 96 of the cylindrical blank 94 is machined to form an open cup-shaped configuration defining the cavity 22 therein. Advantageously, the cavity 22 includes an internal annular recess 82 which defines the cylindrical post 23 and coaxially surrounds portions of the separator 32 and emissive element 28. In addition, the internal annular recess 82 includes an internal surface 83. In other words, the internal annular recess 82 is formed, such as by trepanning or other machining operation, to define the cylindrical post 23. The external periphery of the cylindrical blank 94 is also shaped as desired, including formation of external threads 102 at the rear end 19 of the holder 16. Finally, the front face 95 of the blank 94 and the end faces 29 and 36 of the emissive element 28 and separator 32, respectively, are machined so that they are substantially flat and flush with one another.

Figure 11:
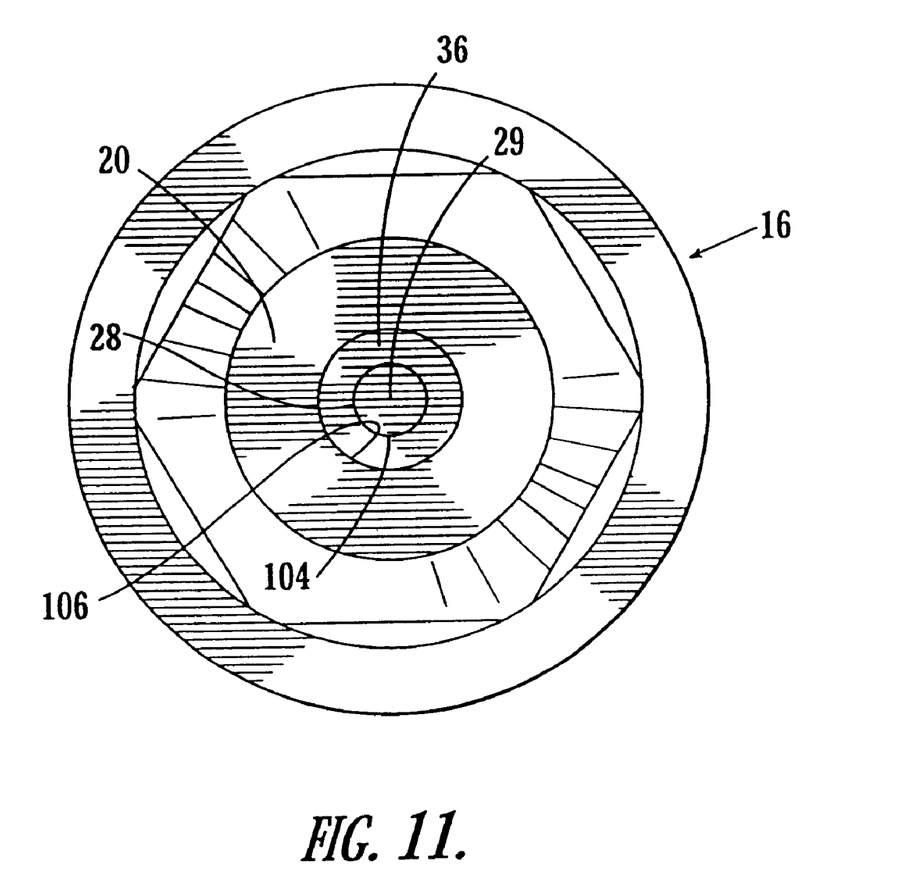
FIG. 11 is an end elevational view of the finished electrode in accordance with the present invention.

FIG. 11 depicts an end elevational view of the holder 16. It can be seen that the end face 36 of the separator 32 separates the end face 29 of the emissive element 28 from the front face 20 of the holder 16. The end face 36 is annular having an inner perimeter 104 and an outer perimeter 106. The separator 32 serves to discourage the arc from detaching from the emissive element and becoming attached to the holder 16.

Thus, the present invention provides an electrode 14 for use in a plasma arc torch and a method of making an electrode wherein at least one heating process is applied to the electrode to form an intermetallic compound 88 between the emissive element 28 and the separator 32, and/or a eutectic alloy between the separator 32 and the metallic holder 16. A crimping process can also be applied to further strengthen and bond these components of the electrode 14. Advantageously, no brazing layers, coatings, or other materials are used between the emissive element 28, separator 32, and metallic holder 16. In fact, the emissive element and separator, and the separator and metallic holder are assembled in surface-to-surface contact, respectively. Thus, the cost of fabricating an electrode according to the present invention is reduced, while still providing a strong and long-lasting electrode.

Many modifications and other embodiments of the invention will come to mind to one skilled in the art to which this invention pertains having he benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of fabricating an electrode adapted for supporting an arc in a plasma torch, the method comprising:
   providing a relatively non-emissive separator defining a cavity therein having an inner surface;
   positioning an emissive element having an outer surface in the separator such that the outer surface of the emissive element and the inner surface of the separator are in surface-to-surface contact; and
   heating the emissive element and the separator such that an intermetallic compound is formed therebetween.

2. A method according to claim 1, wherein the positioning step includes positioning the emissive element such that an inner end face of the emissive element is in surface-to-surface contact with the inner surface of the cavity defined by the separator.

3. A method according to claim 1, wherein the providing step includes providing a separator formed substantially from at least one of the materials from the group consisting of silver, gold, platinum, rhodium, iridium, palladium, nickel, and alloys thereof.

4. A method according to claim 1, wherein the heating step includes heating the emissive element and the separator to between about 1700° F.–1800° F.

5. A method according to claim 1, further comprising crimping the emissive element and the separator before the heating step.

6. A method of fabricating an electrode adapted for supporting an arc in a plasma torch, the method comprising:
   providing a metallic holder;
   positioning an emissive element having an outer surface in a cavity defined by a relatively non-emissive separator so that the outer surface of the emissive element and the cavity defined by the separator are in surface-to-surface contact;
   heating the emissive element and the separator such that an intermetallic compound is formed therebetween;
   positioning the emissive element and the separator such that the separator and the holder are in surface-to-surface contact; and
   forming a eutectic alloy between the metallic holder and the separator.

7. A method according to claim 6, wherein the providing step includes providing a metallic holder formed substantially from copper.

8. A method according to claim 6, wherein the emissive element positioning step includes positioning the emissive element such that an inner end face of the emissive element is in surface-to-surface contact with the cavity defined by the separator.

9. A method according to claim 6, wherein heating step includes heating the emissive element and the separator to between about 1700° F.–1800° F.

10. A method according to claim 6, wherein the forming step includes heating the metallic holder and separator to between about 1400° F.–1450° F.

11. A method according to claim 10, wherein the forming step includes crimping the electrode upon the formation of the eutectic alloy.

12. A method according to claim 6, wherein the forming step includes heating the metallic holder and separator such that the eutectic alloy is formed in about 10–20 minutes.

13. A method according to claim 6, wherein the forming step includes heating the metallic holder and separator to between about 1430° F.–1435° F. for between about 10–20 minutes.

14. An electrode for a plasma arc torch, comprising:
   a metallic holder;
   a relatively non-emissive separator having inner and outer surfaces with the outer surface of the separator being in surface-to-surface contact with the metallic holder;
   an emissive element having an outer surface, at least a portion of the outer surface of the emissive element being in surface-to-surface contact with the inner surface of the separator;
   an intermetallic compound interposed between the emissive element and the separator; and
   a eutectic alloy interposed between the separator and the metallic holder.

15. An electrode according to claim 14, wherein the metallic holder is formed substantially from the group consisting of copper and alloys thereof.

16. An electrode according to claim 14, wherein the relatively non-emissive separator is formed substantially from at least one of the materials from the group consisting of silver, gold, platinum, rhodium, iridium, palladium, nickel, and alloys thereof.

17. An electrode according to claim 14, wherein the emissive element is formed substantially from at least one of the materials from the group consisting of hafnium, zirconium, tungsten, and alloys thereof.

18. An electrode for a plasma arc torch, comprising:
   a metallic holder;
   a relatively non-emissive separator connected to the holder and defining a cavity therein;
   an emissive element being disposed in the cavity defined by the separator; and
   an intermetallic compound interposed between the emissive element and the separator.

19. An electrode according to claim 18, wherein the relatively non-emissive separator is formed substantially from at least one of the materials from the group consisting of silver, gold, platinum, rhodium, iridium, palladium, nickel, and alloys thereof.

20. An electrode according to claim 18, wherein the emissive element is formed substantially from at least one of the materials from the group consisting of hafnium, zirconium, tungsten, and alloys thereof.

21. An electrode for a plasma arc torch, comprising:
   a metallic holder;
   a relatively non-emissive separator connected to the holder and defining a cavity therein;
   an emissive element being disposed in the cavity defined by the separator; and
   a eutectic alloy interposed between the separator and the metallic holder.

22. An electrode according to claim 21, wherein the relatively non-emissive separator is formed substantially from at least one of the materials from the group consisting of silver, gold, platinum, rhodium, iridium, palladium, nickel, and alloys thereof.

23. An electrode according to claim 21, wherein the emissive element is formed substantially from at least one of the materials from the group consisting of hafnium, zirconium, tungsten, and alloys thereof.

24. An electrode for a plasma arc torch, comprising:
   a metallic holder;
   a relatively non-emissive separator connected to the metallic holder and defining a cavity therein;
   an emissive element disposed in the cavity defined by the separator; and an intermetallic compound interposed between the emissive element and the separator, the intermetallic compound being formed by the emissive element and the separator.

25. An electrode according to claim 24, wherein the relatively non-emissive separator is formed substantially from at least one of the materials from the group consisting of silver, gold, platinum, rhodium, iridium, palladium, nickel, and alloys thereof.

26. An electrode according to claim 24, wherein the emissive element is formed substantially from at least one of the materials from the group consisting of hafnium, zirconium, tungsten, and alloys thereof.

27. An electrode for a plasma arc torch, comprising:

a metallic holder;

a relatively non-emissive separator connected to the metallic holder and defining a cavity therein;

an emissive element disposed in the cavity defined by the separator; and a eutectic alloy interposed between the separator and the metallic holder, the eutectic alloy being formed by the separator and the metallic holder.

28. An electrode according to claim 27, wherein the relatively non-emissive separator is formed substantially from at least one of the materials from the group consisting of silver, gold, platinum, rhodium, iridium, palladium, nickel, and alloys thereof.

29. An electrode according to claim 27, wherein the emissive element is formed substantially from at least one of the materials from the group consisting of hafnium, zirconium, tungsten, and alloys thereof.

30. An electrode for a plasma arc torch, comprising:

a metallic holder;

a relatively non-emissive separator having inner and outer surfaces with the outer surface of the separator being in surface-to-surface contact with the metallic holder;

an emissive element having an outer surface, at least a portion of the outer surface of the emissive element being in surface-to-surface contact with the inner surface of the separator;

an intermetallic compound interposed between the emissive element and the separator, the intermetallic compound being formed by the emissive element and the separator; and a eutectic alloy interposed between the separator and the metallic holder.

31. An electrode according to claim 30, wherein the metallic holder is formed substantially from the group consisting of copper and alloys thereof.

32. An electrode according to claim 30, wherein the relatively non-emissive separator is formed substantially from at least one of the materials from the group consisting of silver, gold, platinum, rhodium, iridium, palladium, nickel, and alloys thereof.

33. An electrode according to claim 30, wherein the emissive element is formed substantially from at least one of the materials from the group consisting of hafnium, zirconium, tungsten, and alloys thereof.

* * * * *

UNITED STATES PATENT AND TRADEMARK OFFICE
CERTIFICATE OF CORRECTION

PATENT NO. : 6,433,300 B1
DATED : August 13, 2002
INVENTOR(S) : McBennett

It is certified that error appears in the above-identified patent and that said Letters Patent is hereby corrected as shown below:

<u>Title page,</u>
Item [56], References Cited, U.S. PATENT DOCUMENTS, insert the following:

| | | |
|---|---|---|
| -- 3,198,932 | 08/1965 | Weatherly |
| 3,930,139 | 12/1975 | Bykhovsky et al. |
| 4,056,644 | 11/1977 | Howard et al. |
| 4,304,984 | 12/1981 | Bolotnikov et al. |
| 4,749,594 | 06/1988 | Malikowski et al. |
| 4,766,349 | 08/1988 | Johansson et al. |
| 4,843,206 | 06/1989 | Azuma et al. |
| 5,021,627 | 06/1991 | Bersch et al. |
| 5,023,425 | 06/1991 | Severance, Jr. |
| 5,097,111 | 03/1992 | Severance, Jr. |
| 5,200,594 | 04/1993 | Okada et al. |
| 5,628,924 | 05/1997 | Yoshimitsu et al. |
| 5,676,864 | 10/1997 | Walters |
| 5,767,478 | 06/1998 | Walters |
| 5,776,556 | 07/1998 | Lazarov et al. |
| 5,851,678 | 12/1998 | Hasz et al. |
| 5,857,888 | 01/1999 | Tada et al. |
| 6,066,827 | 05/2000 | Nemchinsky -- |

UNITED STATES PATENT AND TRADEMARK OFFICE
CERTIFICATE OF CORRECTION

PATENT NO. : 6,433,300 B1
DATED : August 13, 2002
INVENTOR(S) : McBennett

It is certified that error appears in the above-identified patent and that said Letters Patent is hereby corrected as shown below:

OTHER PUBLICATIONS, insert the following:

-- Cross-sectional view of an Electrode. --.

Signed and Sealed this

Fourth Day of February, 2003

JAMES E. ROGAN
*Director of the United States Patent and Trademark Office*